United States Patent
Wang

[11] Patent Number: 5,778,242
[45] Date of Patent: Jul. 7, 1998

[54] SOFTWARE INTERRUPT GENERATOR FOR COMPUTER BUS INTERFACE

[75] Inventor: Hans Wang, San Jose, Calif.

[73] Assignee: National Semiconductor Corporation, Santa Clara, Calif.

[21] Appl. No.: 893,903

[22] Filed: Jul. 11, 1997

Related U.S. Application Data

[63] Continuation of Ser. No. 375,755, Jan. 20, 1995, abandoned.

[51] Int. Cl.[6] ........................................................ G06F 13/00
[52] U.S. Cl. ........................... 395/800.4; 395/309; 395/733
[58] Field of Search ........................................ 395/828, 830, 395/834, 838, 287, 309, 728, 732, 733, 739, 740, 200.8, 200.83, 800.01, 800.4, 500, 376; 370/401, 402; 340/825.5

[56] References Cited

U.S. PATENT DOCUMENTS

| | | | |
|---|---|---|---|
| 4,086,627 | 4/1978 | Bennett et al. | 395/740 |
| 5,446,910 | 8/1995 | Kennedy et al. | 395/800 |
| 5,475,846 | 12/1995 | Moore | 395/733 |
| 5,506,997 | 4/1996 | Maguire et al. | 395/800 |
| 5,535,400 | 7/1996 | Belmont | 395/750 |
| 5,544,334 | 8/1996 | Noll | 395/309 |

*Primary Examiner*—Alpesh M. Shah
*Attorney, Agent, or Firm*—Skjerven, Morrill, MacPherson, Franklin & Friel LLP; Norman R. Klivans

[57] ABSTRACT

A computer peripheral interface solves the problem of the interrupt-line mismatch between the PCI and ISA bus architectures without requiring additional interrupt lines between ISA devices and the computer. To accomplish this, a PCI-ISA bridge is provided that responds to ISA interrupts by generating a predetermined software interrupt instruction over the PCI bus. The peripheral interface includes a software-interrupt register and associated circuitry for accepting this software interrupt instruction and generating a corresponding simulated hardware interrupt. To solve problems associated with allowing two like-addressed devices to share a single bus, the computer peripheral interface uses a unique subtractive decoding scheme that allows the processor to selectively access either an internal floppy disk drive controller or a like-addressed peripheral floppy disk drive controller on the shared PCI bus.

6 Claims, 4 Drawing Sheets

SOFTWARE INTERRUPT GENERATOR FOR COMPUTER BUS INTERFACE

This application is a continuation of application Ser. No. 08/375,755, filed on Jan. 20, 1995, now abandoned.

BACKGROUND OF THE INVENTION

1. Field of the Invention

This invention relates to bus interfaces for microprocessor-based computers, and in particular to a bus interface that allows a microprocessor to selectively access more than one like-addressed device connected to a single bus.

2. Description of the Prior Art

The microprocessor-based personal computer industry standard architecture (ISA) has been predominate for many years. The microprocessor-based computer industry has adopted a new bus standard, called the Process Control Interface (PCI) standard. (See *ISA System Architecture*, Second Edition, by Tom Shanley and Don Anderson, Texas: Mindshare Press, 1993, and *PCI System Architecture*, Second Edition, also by Tom Shanley and Don Anderson, Texas: Mindshare Press, 1994, both incorporated herein by this reference.)

The adoption of any new bus architecture is complicated by the fact that the pre-existing architecture leaves a legacy of programs and peripheral devices, such as floppy disk drives, adapted to that architecture. Although computer manufacturers would prefer that users simply buy new devices and programs compatible with the new architecture, many users do not. Thus, computer manufacturers who use a new bus architecture often provide an interface between the new bus architecture and the pre-existing bus architecture. For example, manufacturers who use the new PCI bus architecture provide an interface between the new PCI bus architecture and the older ISA bus architecture. Unfortunately, the differences between these two architectures render design of such an interface problematic.

Figure 1:
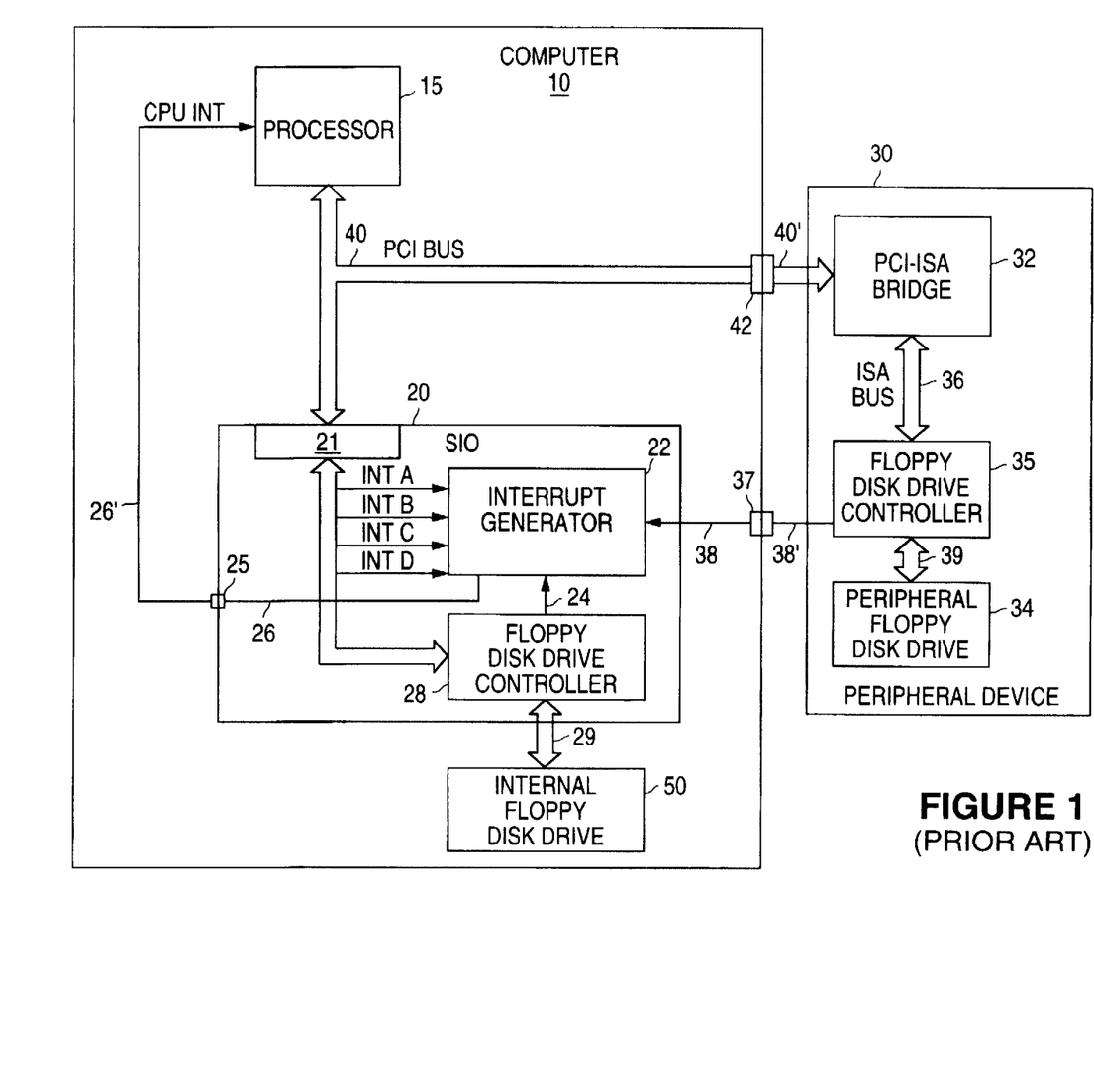
FIG. 1 shows a prior art peripheral interface system with additional interrupt lines between the peripheral device and the computer.

FIG. 1 shows a prior art peripheral interface system between a computer 10 using the PCI architecture and a peripheral device 30 using the ISA architecture. Computer 10 is any computer that is adaptable to the PCI bus architecture. Manufacturers of such computers include International Business Machines (IBM) and Apple Computer.

Computer 10 conventionally includes, among other devices, a processor 15, an internal floppy disk drive 50, and a system input-output (SIO) device 20 connected to processor 15 by an interface 21 and PCI bus 40. A PCI bus connector 42 connects PCI bus 40 to peripheral device 30 via a PCI bus 40'. PCI buses 40 and 40' include a PCI clock line (not shown), which carries a PCI clock signal. All transactions on PCI buses 40 and 40' are synchronized to the PCI clock signal.

SIO device 20 includes an interrupt generator circuit 22 that receives as input the signals on four peripheral interrupt lines (INT A-D) that are part of PCI bus 40. Peripheral interrupt lines INT A-D are for receiving PCI interrupt signals from peripheral devices, such as printers, modems, magnetic tape drives, hard disk drives, and floppy disk drives. Peripheral devices using PCI interrupt lines INT A-D must be adapted to the interrupt protocol used by the PCI architecture. SIO device 20 also includes an internal floppy disk drive controller 28 coupled to internal floppy disk drive 50 via a first floppy disk drive interface bus 29.

Hardware interrupt line 24 carries interrupt signals directly from internal floppy disk drive controller 28. Other hardware interrupt lines (not shown) carry interrupt signals from other interrupt sources, such as modems, hard disk drive controllers, keyboard, parallel ports, and serial ports. In addition, one or more peripheral interrupt lines 38 can be coupled from peripheral device 30 through a connector 37 to interrupt generator circuit 22. This may be necessary where, for example, the bus architecture of peripheral device 30 does not have interrupt lines that are compatible with peripheral interrupt lines INT A-D of PCI bus 40. Interrupt generator circuit 22 is coupled to processor 15 through a processor interrupt line 26, an output terminal 25, and a processor interrupt line 26'.

Peripheral device 30 includes a PCI-ISA bridge circuit 32 coupled to an ISA-compatible peripheral floppy disk drive controller 35 via an ISA bus 36. While peripheral floppy disk drive controller 35 is shown in FIG. 1, other ISA-compatible devices may be coupled to ISA bus 36 in place of, or in addition to, peripheral floppy disk drive controller 35. Peripheral device 30 also includes a peripheral floppy disk drive 34, which is coupled to peripheral floppy disk drive controller 35 through a second floppy disk drive interface bus 39.

PCI-ISA bridge circuit 32 translates instructions on PCI bus 40 to ISA instructions and outputs the translated instructions to an ISA-compatible device, such as peripheral floppy disk drive controller 35, through ISA bus 36. PCI-ISA bridge circuit 32 also translates instructions on ISA bus 36 to PCI instructions and outputs the translated instructions on PCI bus 40. An example of a PCI-ISA bridge circuit is the VL82C593 integrated circuit supplied by VLSI Technology, Inc.

One problem associated with providing an interface between a PCI bus and an ISA bus is that the interrupt lines for the two buses are not compatible. The PCI bus architecture makes use of only four peripheral interrupt lines, INT A-D. The ISA architecture, on the other hand, has 16 interrupt lines, IRQ 0–15. This and other protocol differences mean that interrupt requests from peripheral floppy disk drive controller 35 on ISA bus 36 cannot be translated directly from ISA bus 36 to PCI bus 40.

As shown in FIG. 1, one prior-art solution to this interrupt mismatch problem has been to simply add interrupt lines 38 and 38' to computer 10 and peripheral device 30, respectively, and to couple interrupt lines 38 and 38' between peripheral floppy disk drive controller 35 and interrupt generator circuit 22 using a connector 37. This solution requires additional interrupt lines (38 and 38') be connected between interrupt generator 22 and floppy disk drive controller 35. Moreover, additional interrupt lines (not shown) similar to lines 38 and 38' must be provided for each additional interrupt source on ISA bus 36.

PCI is a standard bus, and is therefore widely available and relatively inexpensive. An additional bus or a special PCI bus with additional lines makes a system more expensive. Thus, there is a need for a peripheral interface that allows a peripheral device to generate interrupt signals to the interrupt block of a computer without the need for additional interrupt lines.

A second problem associated with an interface between a PCI bus and an ISA bus is that the shared bus may be connected to two or more devices (e.g., two floppy disk drive controllers) that have the same address. This problem is not unique to PCI-ISA interfaces, but occurs whenever two or more like-addressed devices are connected in parallel to a single bus.

For processor 15 to communicate with a particular device on PCI bus 40, processor 15 must direct its instructions to the address or addresses of that device. For this reason, devices designed to connect to a bus, such as floppy disk drive controllers, are configured to respond to standard addresses, and programs are written to direct processor instructions to these standard addresses. For example, the address range 3F0–3F7(hexadecimal) is an industry standard for IBM PC compatible floppy disk drive controllers. These standard addresses may be programmed into the basic input-output system (BIOS) software, the disk operating system (DOS), or even applications programs. Because many programs rely on the established standard addresses for accessing particular types of devices, any device residing on a standard bus and not configured to respond to those standard addresses is incompatible with many programs, including basic input-output system (BIOS) programs, disk operating systems (DOS), and some applications programs.

Having a single set of standard addresses for floppy disk controllers (i.e., 3F0–3F7) does not pose a problem in most IBM PC-based systems because they use a single floppy disk drive controller to control all of the floppy disk drives, whether internal or peripheral, connected to the system. Thus, when the processor wants to access a particular peripheral floppy disk drive, the processor issues instructions addressed to the one controller, thereby indicating to the one controller that the processor wants to access the peripheral floppy disk drive. The one controller responds to the request and sends the necessary instructions to the peripheral floppy disk drive.

In the system of FIG. 1, two floppy disk drive controllers, internal floppy disk drive controller 28 and peripheral floppy disk drive controller 34, are operated in parallel on same PCI bus 40. Internal floppy disk drive controller 28 is coupled directly to PCI bus 40, while peripheral floppy disk drive controller 34 is coupled to PCI bus 40 via ISA bus 36 and PCI-ISA bridge circuit 32.

Because all IBM PC compatible floppy disk drive controllers are configured to respond to the same address range, operating more than one floppy disk drive controller on a single bus will cause conflicts. For example, if processor 15 attempts to access the two like-addressed floppy disk drive controllers at the same time, both controllers may simultaneously attempt to send data to processor 15 over PCI bus 40, resulting in a bus conflict.

One prior art solution to this problem is to provide different addresses for each of floppy disk drive controllers 28 and 35. Unfortunately, this requires modifying whatever programs processor 15 uses for floppy disk drive access (e.g., the BIOS, the DOS, and some applications programs) so that when processor 15 attempts to access peripheral floppy disk drive 30 it sends write access instructions to addresses other than those standard addresses normally associated with floppy disk drive control (i.e., hexadecimal 3F0–3F7). Thus, such a system would not be compatible with available, standard programs.

A second prior art solution to the conflicts associated with using two devices having the same address on the same bus is known as "subtractive decoding." In one example of this method, PCI-ISA bridge circuit 32 is configured to wait five PCI clock cycles before responding to any instruction on PCI bus 40.

When an instruction is available on PCI bus 40, SIO device 20 determines whether the instruction address is one that SIO device 20 has been configured to respond to. If so, SIO device 20 will assert a device select signal on the DEVSEL line of PCI bus 40, indicating to other devices on PCI bus 40 that SIO 20 has accepted the instruction. PCI-ISA bridge circuit 32 will sense the device select signal prior to the end of the five-PCI-clock-cycle delay and will therefore refrain from responding to the instruction. SIO device 20 is then able to respond to the instruction without a possible conflict from peripheral device 30.

If, on the other hand, the address of the instruction on PCI bus 40 is not one of the addresses that SIO device 20 has been configured to respond to, SIO device 20 will not assert a device select signal on the DEVSEL line of PCI bus 40. Without the device select signal asserted, peripheral device 30 will, after the five-PCI-clock-cycle delay, determine whether the instruction is directed to an address that peripheral device 30 is configured to respond to. This type of instruction decoding is called "subtractive decoding" because the controller that decodes instructions for processor 15 (e.g., SIO 20) first "subtracts" out the instructions addressed to it, leaving the remaining instructions to other devices on PCI bus 40.

Subtractive decoding works well for merely avoiding bus conflicts. However, subtractive decoding alone does not allow processor 15 to selectively access either of the like-addressed internal and peripheral floppy disk drive controllers 28 and 34, respectively. Only the controller that is configured to respond first to instructions directed to the shared address will ever have the opportunity to respond. In FIG. 1, for example, processor 15 would only have access to the information contained in internal floppy disk drive 50 because SIO 20 would always respond to floppy disk drive access requests from processor 15 by asserting the DEVSEL signal, thereby keeping the peripheral floppy disk drive controller 35 from responding.

For the foregoing reasons, there is a need for bus interface system that allows a processor to selectively access two or more devices having the same address on a single bus without requiring modifications of standard programs.

SUMMARY

The present invention is directed to a PCI-ISA bus interface system that solves the problem of the interrupt line mismatch between PCI and ISA bus architectures, without requiring additional lines, and that allows a processor to selectively access two or more like-addressed devices (e.g., two floppy disk drive controllers) on a single bus. While described herein in connection with PCI and ISA bus architectures, the present invention may be applied more generally to other bus architectures.

An interface system in accordance with the present invention includes a system input-output controller for controlling input to and output from the processor and a bus connected between the processor and the system input-output controller. The shared bus may be connected to a peripheral device, such as a floppy disk drive controller, so that the bus can be used to communicate between the processor, the system input-output controller, and the peripheral device.

The system input-output controller includes a software-interrupt register for storing software-interrupt instructions from the peripheral device over the bus. In response to software-interrupt instructions, the system input-output controller simulates a hardware interrupt to the processor. Thus, a peripheral device can interrupt the processor without the need for additional interrupt lines from the peripheral device.

To avoid bus conflicts when using two like-addressed floppy disk drive controllers on the same bus (the second technical problem referred to above), the system input-output controller includes an instruction monitoring circuit that monitors instructions from the processor to a common address associated with the internal and peripheral floppy disk drive controllers to determine which floppy disk drive controller should respond to the request. The peripheral floppy disk drive controller waits several clock cycles before responding so that the bus interface has time to determine which controller should respond. If the instruction monitoring circuit determines that the internal floppy disk drive controller should respond, the instruction monitoring circuit issues a device select signal on the PCI bus that keeps the peripheral floppy disk drive controller from responding to the request. If, on the other hand, the instruction monitoring circuit determines that the request is for the peripheral floppy disk drive controller, the instruction monitoring circuit does not respond, but instead allows the peripheral floppy disk drive controller to process the instruction.

DETAILED DESCRIPTION

Figure 2:
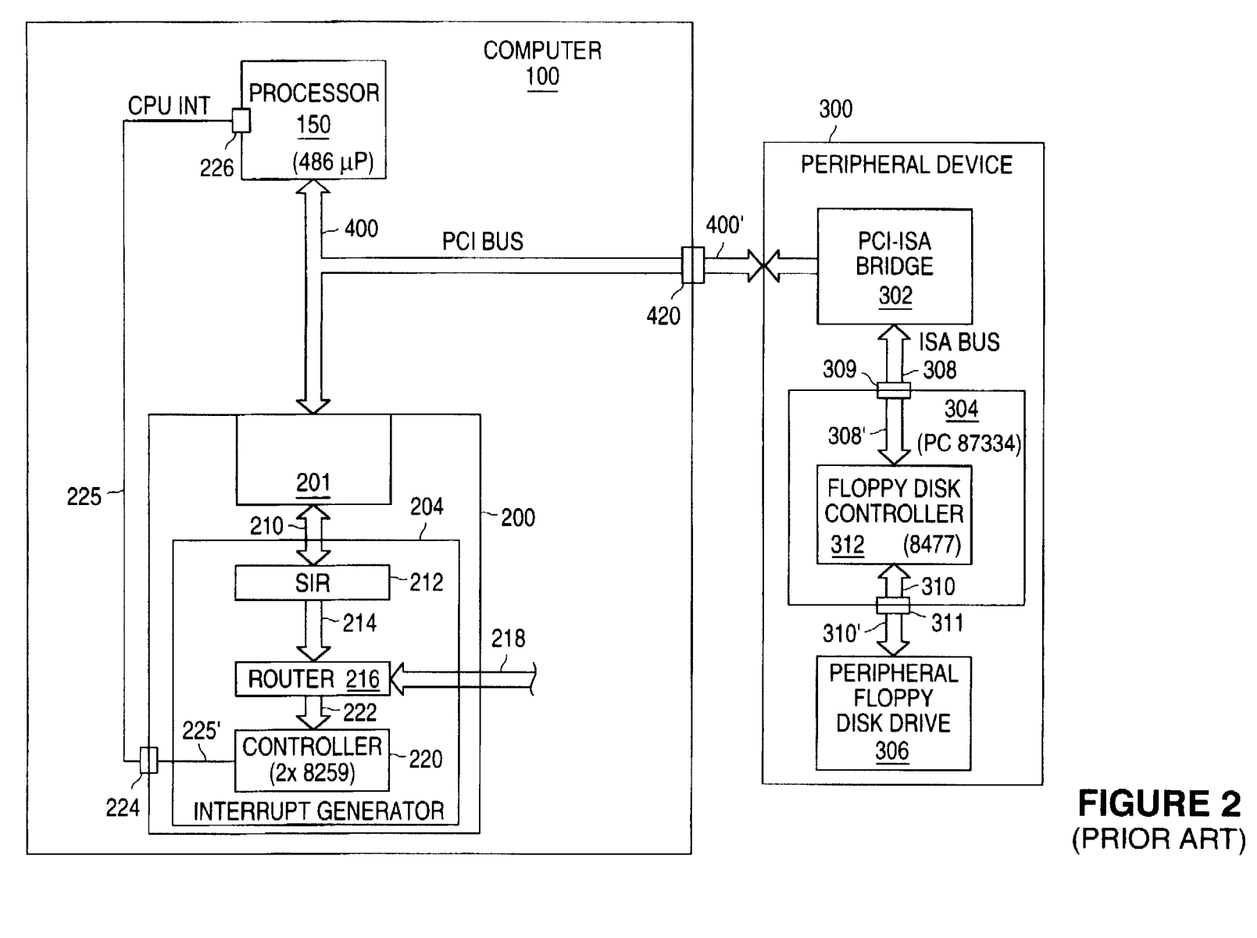
FIG. 2 shows a peripheral interface system in an embodiment of the present invention that solves the problem of the interrupt-line mismatch between PCI and ISA bus architectures without requiring additional lines.

FIG. 2 shows a peripheral interface for a computer system in accordance with one embodiment of the present invention. The system of FIG. 2 may be compared to the prior art of FIG. 1, except that the present interface eliminates the need for connector 37 and peripheral interrupt lines 38 and 38'.

The system of FIG. 2 provides an interface between a processor 150 coupled to a PCI bus 400 and a peripheral device 300 coupled to an ISA bus 308. Computer 100 conventionally includes, inter alia, a processor 150, which in one embodiment is a 486 microprocessor supplied by Intel Corporation. However, the peripheral interface of the present invention is not dependent on the processor used, and so may be used with many other processors, including the Pentium microprocessor by Intel and the PowerPC by Motorola. Computer 100 also includes a PCI system input-output circuit (PCI-SIO) device 200 connected by PCI bus 400. A PCI bus connector 420 connects computer 100 to a peripheral device 300 via a PCI bus 400'.

Figure 3:
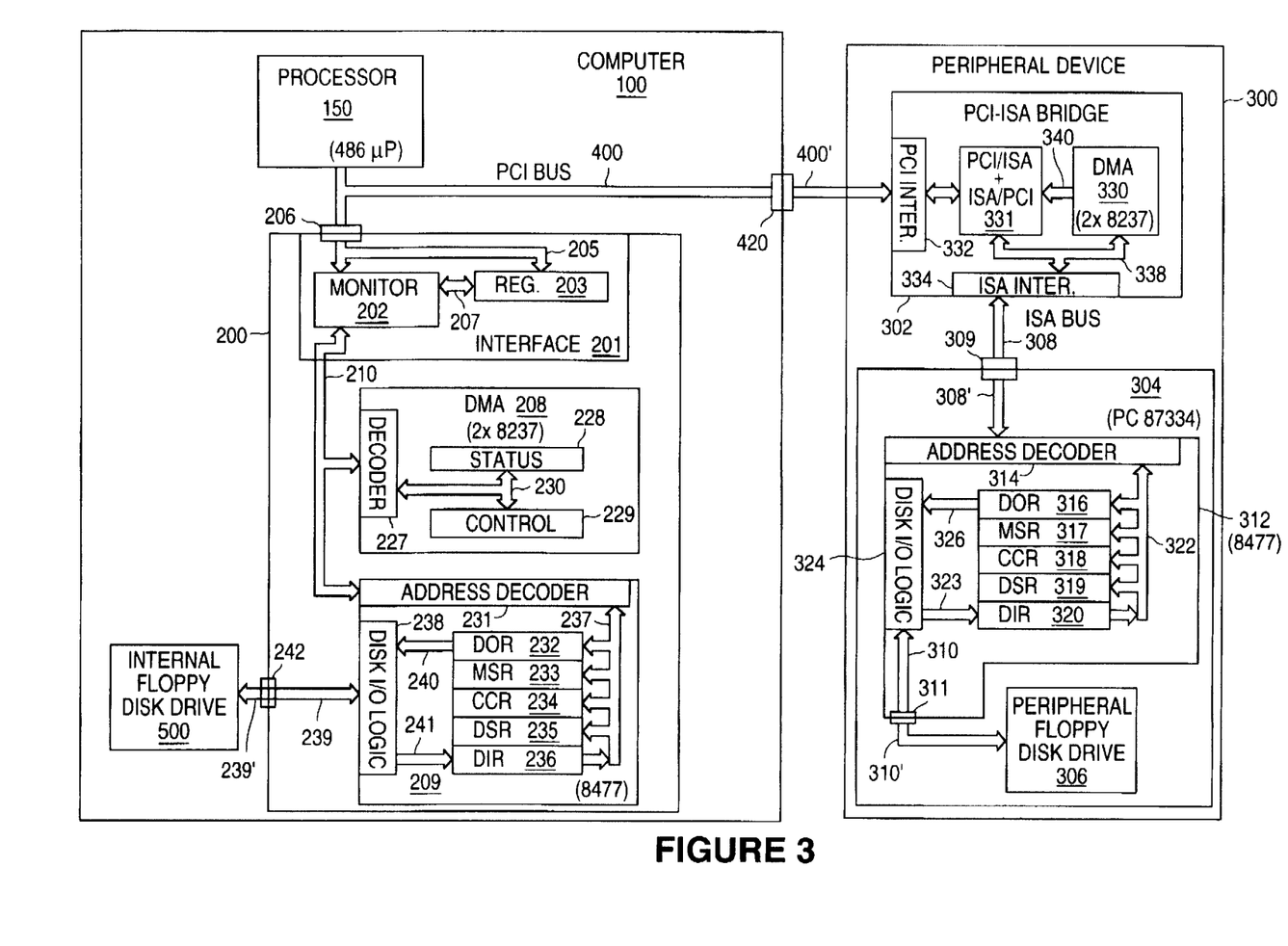
FIG. 3 shows a peripheral interface system in a second embodiment of the present invention that solves problems associated with allowing two like-addressed devices to share a single bus.

PCI-SIO device 200 may be a single integrated circuit mounted on the motherboard of computer 100. PCI-SIO device 200 includes a bus interface 201 and an interrupt generator circuit 204, connected by a first internal interconnect bus 210. As shown in FIG. 3, PCI-SIO device 200 also includes, inter alia, a direct memory access (DNA) controller 208 and an internal floppy disk drive controller 209. These components are not necessary to the explanation of the embodiment of FIG. 2, but will be described below in connection with a second embodiment of the present invention and FIG. 3.

Referring again to FIG. 2, interrupt generator circuit 204 includes a software-interrupt register (SIR) 212. In accordance with the present invention, SIR 212 stores software-interrupt instructions from a PCI-ISA bridge circuit 302 received over PCI bus 400 so that peripheral device 300 can initiate interrupt requests without the need for additional interrupt lines. This feature is explained below in detail.

SIR 212 is coupled to an interrupt router 216 by a first interrupt router input bus 214. Interrupt router 216 also receives input from a hardware interrupt bus 218 that includes interrupt lines from hardware interrupt sources, such as floppy disk drive controllers, modems, hard disk drive controllers, keyboards, parallel ports, and serial ports. Interrupt router 216 routes the output of each interrupt source, including SIR 212, to one of 15 interrupt channels of an interrupt controller 220. In one embodiment of the present invention, interrupt controller 220 is a pair of master-slave coupled 8259 interrupt controllers of the type commercially available from National Semiconductor. A single 8259 interrupt controller handles up to eight interrupt inputs. Coupling the interrupt output of a slave 8259 interrupt controller to one of eight interrupt inputs of a master 8259 interrupt controller allows the pair of 8259 interrupt controllers to handle up to 15 interrupt inputs. Combining more than one 8259 interrupt controller in a master-slave configuration to increase the number of interrupt channels is well known to those skilled in the art.

The manner in which interrupt requests are processed by interrupt controller 220 is determined when the controller 220 is configured by processor 150 at start-up, and can be changed dynamically at any time during the main program. For example, at start-up processor 150 could configure interrupt controller 220 to give a keyboard interrupt lower priority than an interrupt from peripheral floppy disk drive controller 312. Later, if a particular program required keyboard interrupts that have higher priority than interrupts from peripheral floppy disk drive controller 312, processor 150 can dynamically change the configuration of interrupt controller 220 to reflect the change in priority.

If interrupt requests from interrupt router 216 are pending, interrupt controller 220 uses a priority scheme to determine which, if any, of the pending interrupt requests from interrupt router 216 is the most important, and then outputs a processor interrupt (CPU_INT) signal to processor 150 through an interrupt line 225', an interrupt output terminal 224, processor interrupt line 225, and an interrupt input terminal 226.

Peripheral device 300 includes a PCI-ISA bridge circuit 302 coupled to a peripheral floppy disk drive controller 312 via ISA buses 308 and 308' and a connector 309, and a peripheral floppy disk drive 306 coupled to the peripheral floppy disk drive controller 312. In one embodiment of the present invention, peripheral floppy disk drive controller 312 is an Enhanced 8477 floppy disk drive controller integrated into an ISA input-output controller (ISA-SIO) 304, which is a PC87334 "Super I/O™," supplied by National Semiconductor. The preliminary specification of the PC87334 "Super I/O™," published in April of 1994, is incorporated herein by reference.

Interrupt generator circuit 204 allows peripheral floppy disk drive controller 312 to generate an interrupt to processor 150 on interrupt input terminal 226. While interrupt requests are described as originating from peripheral floppy disk drive controller 312, the present system may be configured to accept interrupt requests from other interrupt sources, such as modems, hard disk drive controllers, and tape drive controllers.

PCI-ISA bridge circuit 302 is, in one embodiment of the present invention, a bridge circuit having the functions of a VL82C593 integrated circuit supplied by VLSI Technology, Inc., and having the additional logic circuitry functions represented by the Verilog hardware description language (HDL) code of Appendix A. The code of Appendix A is written in Verilog HDL version 1.7, which is available from Cadence Design Systems, Inc. of San Jose, Calif. Verilog HDL language is well known to those skilled in the art. Conventional circuitry synthesis programs, also well known to those skilled in the art, are available to convert Verilog HDL code to the masks necessary to provide logic circuitry that performs the functions described by the Verilog HDL code. Hence, Appendix A provides a detailed description of novel aspects of PCI-ISA bridge circuit 302. The function of the Verilog HDL code of Appendix A is explained below in connection with FIG. 2.

PCI-ISA bridge circuit 302 is configured at start-up by processor 150 to provide particular software interrupt instructions over PCI bus 400 in response to interrupts from ISA bus 308. To generate an interrupt to processor 150, peripheral floppy disk drive controller 312 issues an interrupt request on one of 16 interrupt lines (IRQ 0–15) on ISA buses 308 and 308'. PCI-ISA bridge 302 receives this request and responds by providing a predetermined software interrupt instruction on PCI bus 400', which is conveyed to interface 201 via PCI bus connector 420 and PCI bus 400. The software interrupt instruction is then routed through bus interface 201 and first internal bus 210 to software-interrupt register (SIR) 212.

In response to software interrupt instructions, SIR 212 provides an output on first interrupt router input bus 214 to interrupt router 216. Interrupt router 216 routes the output from SIR 212 to one of 15 interrupt channels of interrupt controller 220 through third internal bus 222.

Interrupt controller 220 accepts interrupt requests from internal and peripheral devices, determines which of the incoming requests is of the highest priority, ascertains whether the incoming request has a higher priority value than any level currently being serviced, and issues a processor interrupt (CPU_INT) signal on processor interrupt line 225 to interrupt input terminal 226 of processor 150 based on this determination.

The immediate response of processor 150 to the CPU_INT signal is to determine which device initiated the interrupt request. Processor 150 performs this determination by executing an interrupt acknowledge bus cycle on PCI bus 400 to read an interrupt vector from the interrupt controller 220. The interrupt vector identifies which device initiated the interrupt request, which allows processor 150 determine which interrupt service routine to execute. Processor 150 then performs the appropriate interrupt service routine and returns to the interrupted program. Thus, the present invention allows peripheral device 300 to simulate hardware interrupt requests to processor 150 without requiring additional interrupt lines between peripheral device 300 and computer 100.

FIG. 3 shows a peripheral interface system in accordance with a second embodiment of the present invention. The embodiment of FIG. 3 solves the second above-described problem associated with the prior art interface of FIG. 1, in that it allows two like-addressed devices to be selectively accessed on a single bus. To the extent that the embodiment of FIG. 3 is similar to that of FIG. 2, like-numbered elements appear in both figures. It is important to note, however, that while the embodiments of FIGS. 2 and 3 both use the same integrated circuit as PCI-SIO device 200, different portions of PCI-SIO device 200 are referred to describe the function of each embodiment. Those portions of PCI-SIO device 200 not needed to describe the second embodiment are not shown in FIG. 3.

FIG. 3 shows that, in addition to the elements shown in FIG. 2, PCI-SIO device 200 includes a direct memory access (DMA) controller 208 and an internal floppy disk drive controller 209. Bus interface 201 includes an instruction monitoring circuit 202 and a floppy-disk-drive-availability register 203, both of which are connected to PCI Bus 400 via a connector 206 and a PCI interface bus 205, and to each other via a bus 207. Instruction monitoring circuit 202 is connected to DMA controller 208 and internal floppy disk drive controller 209 by first internal interconnect bus 210. In one embodiment, instruction monitoring circuit 202 is integrated into PCI-SIO device 200 as part of interface 201. However, instruction monitoring circuit 202 may also be implemented as a separate device coupled between PCI bus 400 and interface 201.

DMA controller 208 is, e.g., a pair of 8237 DMA controllers of the type commercially available from National Semiconductor, and internal floppy disk drive controller 209 is an Enhanced 8477 floppy disk drive controller, also commercially available from National Semiconductor.

DMA controller 208 includes an address decoder 227, DMA status registers 228, and DMA control registers 229, all of which are connected by a DMA internal interconnect bus 230.

As stated above, internal floppy disk drive controller 209 is an Enhanced 8477 floppy disk drive controller, the operation of which is described in detail in Chapter 3 of the (preliminary) specification of the PC87334 "Super I/O™," which has been incorporated herein by reference. Internal floppy disk drive controller 209 includes an interface and address decoder 231, which is coupled to a digital output register (DOR) 232, a main status register (MSR) 233, a configuration control register (CCR) 234, a data-rate select register (DSR) 235, and a digital input register (DIR) 236 via an internal control and data bus 237. DOR 232 is connected to internal floppy disk input-output logic 238 via an output logic bus 240 and DIR 236 is connected to internal floppy disk input-output logic 238 via an input-logic bus 241.

An internal floppy disk drive 500 is coupled to internal floppy disk input-output logic 238 via floppy-drive interface buses 239 and 239', and a floppy-drive interface connector 242. Internal floppy disk drive 500 is, in one embodiment, a SFD-321D/T floppy disk drive by Samsung, but may be any floppy disk drive that is compatible with the internal floppy disk drive controller 209.

For simplicity, the present disclosure is of a single internal floppy disk drive 500 and a single peripheral floppy disk drive 306. However, the invention may be used with more than one internal floppy disk drive and/or more than one peripheral floppy disk drive. The floppy disk drive controllers of one embodiment are suitable for, inter alia, all PC-AT, EISA, and PS/2 applications.

Peripheral device 300 includes a peripheral floppy disk drive 306, which is, in one embodiment, a SFD321D/T floppy disk drive by Samsung, but may be any floppy disk drive that is compatible with the internal floppy disk drive controller 312. ISA-SIO 304 is connected to peripheral floppy disk drive 306 through peripheral floppy-drive interface buses 310 and 310', and a floppy-drive interface connector 311.

PCI-ISA bridge circuit 302 includes a peripheral DMA controller 330, which in one embodiment includes circuitry equivalent to a pair of 8237 DMA controllers of the type commercially available from National Semiconductor. PCI-ISA bridge circuit 302 also includes a PCI to ISA and ISA to PCI (PCI/ISA-ISA/PCI) converter 331, a PCI interface 332, and an ISA interface 334. PCI interface 332 is connected to PCI/ISA-ISA/PCI converter 331, which is in turn connected to both peripheral DMA controller 330 and ISA interface 334 via a common bus 338. Peripheral DMA controller 330 is also coupled to PCI/ISA-ISA/PCI converter 331 via a DMA bus 340.

As stated above, peripheral floppy disk drive controller 312 is an Enhanced 8477 floppy disk drive controller, the operation of which is described in detail in Chapter 3 of the (preliminary) specification of the PC87334 "Super I/O™," which has been incorporated herein by reference. Peripheral floppy disk controller 312 includes a second interface and address decoder 314, which is coupled to a second digital output register (second DOR) 316, a second main status register (second MSR) 317, a second configuration control register (second CCR) 318, a second data-rate select register (second DSR) 319, and a second digital input register (second DIR) 320 via a second internal control and data bus 322. Second DOR 316 is connected to peripheral floppy disk input-output logic 324 via a second output logic bus 326 and second DIR 320 is connected to peripheral floppy disk input-output logic 324 via a second input logic bus 328. Peripheral floppy disk input-output logic 324 is coupled to peripheral floppy disk drive 306 via peripheral floppy disk drive interface buses 310 and 310', which are coupled by peripheral floppy disk drive interface bus connector 311. Peripheral floppy disk drive controller 312 does not have to be of the same type as internal floppy disk controller 209, but both controllers must recognize the same standard protocol.

DOR 232 is used to enable internal floppy disk drive 500, and second DOR 316 is used to enable peripheral floppy disk drive controller 306. Both DOR 232 and second DOR 316 share a common address. The least-significant two bits written to this common DOR address by processor 150 designate either internal floppy disk drive 500 or peripheral floppy disk drive 306 as the target drive for floppy disk drive access instructions from processor 150.

In accordance with conventional subtractive decoding schemes, PCI-ISA bridge circuit 302 is configured at start-up by processor 150 to provide a five-PCI-clock-cycle delay before instructions on the PCI bus 400 are forwarded to ISA bus 308. In the system of FIG. 3, however, the following modifications to conventional subtractive decoding allow processor 150 to selectively access two devices having the same address.

Instruction monitoring circuit 202 monitors all write access instructions from processor 150 to the common DOR address to determine which of internal floppy disk drive 500 and peripheral floppy disk drive 306 has been selected by processor 150. If instruction monitoring circuit 202 determines from an instruction addressed to the common DOR address that processor 150 is attempting to access internal floppy disk drive 500, then instruction monitoring circuit 202 allows internal floppy disk drive controller 209 to receive the instruction and issues the device select signal over the DEVSEL line of PCI bus 400 before five PCI clock cycles have passed. Because PCI-ISA bridge circuit 302 is configured to provide a five-PCI-clock cycle delay, the DEVSEL signal arrives at PCI-ISA bridge circuit 302 before peripheral floppy disk drive controller 312 receives the instruction and inhibits PCI-ISA bridge circuit 302 from relaying the instruction to the peripheral floppy disk drive controller 312. Thus, instruction monitoring circuit 202 allows only internal floppy disk drive controller 209 to respond to an instruction directed to internal floppy disk drive controller 209.

If, on the other hand, processor 150 issues a write instruction to the common DOR address indicating that processor 150 is trying to access peripheral floppy disk drive 306 in peripheral device 300, instruction monitoring circuit 202 does not pass the instruction on to internal floppy disk drive controller 209, but instead allows peripheral device 300 to receive the instruction after the five-PCI-clock-cycle delay imposed by PCI-ISA bridge 302. Thus, the present system differentiates between two like-addressed controllers (i.e., floppy disk drive controller 209 and peripheral floppy disk drive controller 312), and thereby allows processor 150 to selectively access either floppy disk drive controller.

Verilog HDL code is well known for use in hardware simulation systems to simulate the function of circuitry. The code of Appendix B is the Verilog HDL code for implementing instruction monitoring circuit 202. Hence, Appendix B provides a detailed description of instruction monitoring circuit 202.

Figure 4:
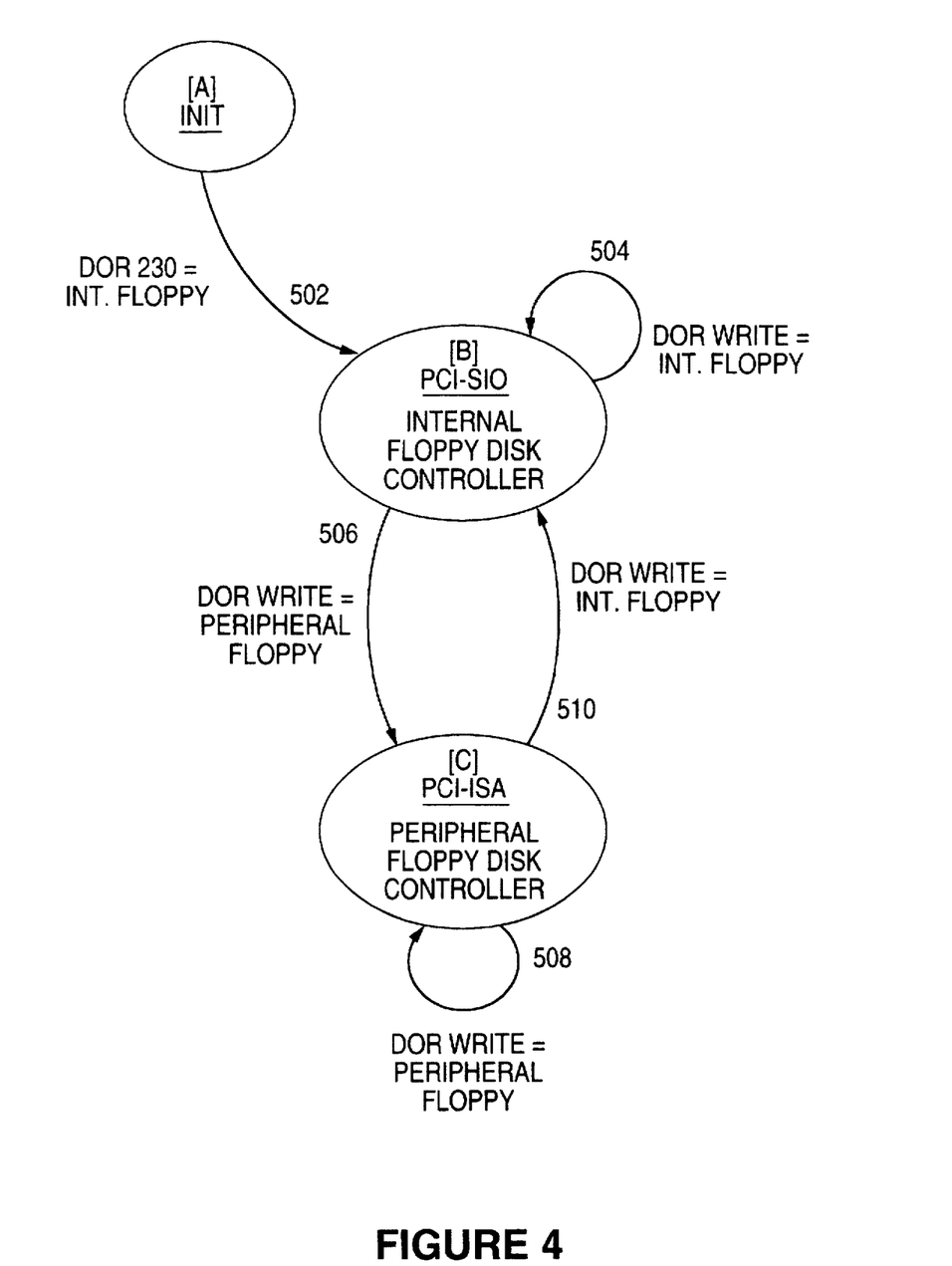
FIG. 4 is a state diagram illustrating how floppy-disk-drive control is switched between an internal and a peripheral floppy disk drive controller in accordance with the embodiment of FIG. 3.

FIG. 4 is a state diagram illustrating how, in accordance with the embodiment of FIG. 3, floppy disk drive control is switched between internal floppy disk drive controller 209 and peripheral floppy disk drive controller 312. The state diagram of FIG. 4 is a functional description of instruction monitoring circuit 202, and hence corresponds to Appendix B.

Beginning at the top of FIG. 4 at state A, processor 150 conventionally determines which floppy disk drives are available and stores availability information in a conventional floppy-disk-drive-availability register 203.

Internal floppy disk drive 500 is preassigned as the "target" for floppy disk drive instructions from processor 150. Because internal floppy disk drive 500 is controlled by internal floppy disk drive controller 209, internal floppy disk drive controller 209 is preassigned to be the "active" floppy disk drive controller. This pre-assignment takes place when computer 100 is booted (i.e., initialized). The present system may also be implemented using other connected floppy disk drives, including peripheral floppy disk drive 306, as the pre-assigned target floppy disk drive. However, the floppy disk drive controller pre-assigned to be active must be the one associated with the target floppy disk drive.

During initialization, processor 150 issues a DSR write instruction that loads both DSR 235 and second DSR 319 with data rate and pre-compensation information for both internal floppy disk drive 500 and peripheral floppy disk drive 306. Processor 150 also issues a CCR write instruction that loads both CCR 234 and CCR 318 with data rate and other device information for both internal floppy disk drive 500 and peripheral floppy disk drive 306. Each subsequent DSR or CCR write instruction will similarly update both registers corresponding to the address of that write instruction.

Returning to the case in which internal floppy disk drive 500 is pre-assigned to be the active floppy disk drive, processor 150 issues a write instruction to write a hexadecimal 1C to the common address associated with DOR 232 and second DOR 316. Instruction monitoring circuit 202 monitors each DOR write instruction (i.e., each instruction having an address corresponding to the common address of DOR 232 and second DOR 316) to determine which floppy disk drive is being accessed, and therefore which floppy disk drive controller must have floppy disk drive control ("ownership"). The hexadecimal 1C indicates that internal floppy disk drive 500 has been selected, and therefore that floppy disk drive control must be given to internal floppy disk drive controller 209. Instruction monitoring circuit 202 grants floppy disk drive control to internal floppy disk drive controller 209 by issuing the device select signal on the DEVSEL line of PCI Bus 400, thereby keeping peripheral device 300 from responding to the DOR write instruction. Processor 150 then issues an MSR read instruction to determine whether internal floppy disk drive 500 is ready for data transfer. MSR read instructions are monitored by the instruction monitoring circuit 202 so that only the active floppy disk drive controller may respond with the contents of its MSR (e.g., when internal floppy disk drive controller 209 is the active controller, instruction monitoring circuit 202 issues a device select signal on the DEVSEL line of PCI bus 400 for each MSR read instruction, thereby keeping peripheral device 300 from responding to the MSR read instruction).

The move from initialization state A to state B, in which internal floppy disk drive controller 209 is the active floppy disk drive controller, is illustrated in FIG. 4 with an arrow 502. From state B, if processor 150 attempts to access internal floppy disk drive 500 by issuing a DOR write instruction on PCI bus 400, floppy disk drive control remains with internal floppy disk drive controller 209, as indicated by an arrow 504 labeled "DOR write=internal floppy."

To access peripheral floppy disk drive 306 from state B, processor 150 first issues an MSR read instruction to determine whether peripheral floppy disk drive 500 is busy. At initialization, the second bit of MSR 233 is set to always indicate that peripheral floppy disk drive 306 is not busy. This indication will always be true while internal floppy disk drive controller 209 is assigned control because the floppy disk drives, being sequential devices, are never accessed simultaneously. Thus, the MSR read instruction will indicate that peripheral floppy disk drive 306 is not busy.

Next, processor 150 issues a DOR write instruction to write a hexadecimal 1D to the common DOR address, which indicates that processor 150 is attempting to access peripheral floppy disk drive 306, and therefore that floppy disk drive control must be given to peripheral floppy disk drive controller 312. In response, instruction monitoring circuit 202 prevents internal floppy disk drive controller 209 from receiving the DOR write instruction and instead allows peripheral floppy disk drive controller 312 to receive the DOR write instruction. This change in the active floppy disk drive controller is illustrated by an arrow 506, labelled "DOR write=peripheral floppy," from state B to state C of FIG. 4.

Once in state C, instruction monitoring circuit will prevent internal floppy disk drive controller 209 from responding to any further floppy disk access instructions (except CCR and DSR write instructions) until processor 150 again issues a DOR write instruction indicating that processor 150 wishes to access an internal floppy disk drive, such as internal floppy disk drive 500. In such a case, instruction monitoring circuit 202 would switch floppy disk drive control back to internal floppy disk drive controller 209, as indicated by an arrow 510 in FIG. 4.

As long as peripheral floppy disk drive controller 312 is the active floppy disk drive controller, instruction monitoring circuit 202 will not issue the device select signal on the DEVSEL line of PCI Bus 400. Peripheral device 300 will therefore receive all floppy disk instructions (i.e., all instruction having addresses 3F0–3F7) after the five-PCI-clock-cycle delay imposed by PCI-ISA bridge circuit 302. As indicated by arrow 508, DOR write instructions that request access to a floppy disk drive associated with peripheral floppy disk drive controller 312 will not effect a change in floppy disk drive control away from peripheral floppy disk drive controller 312.

To initiate a change of floppy disk drive control from peripheral floppy disk drive controller 312 back to internal floppy disk drive controller 209, processor 150 first issues an MSR status read instruction and looks at bit 0 of MSR 317 to determine whether internal floppy disk drive 500 is busy. Bit 0 of MSR 317 is initialized to always indicate that internal floppy disk drive 500 is not busy, which will be true while peripheral floppy disk drive controller 312 is the active controller because internal floppy disk drive 500 cannot be busy while peripheral floppy disk drive controller 312 is the active floppy disk drive controller.

Processor 150 then issues a DOR write instruction to write a hexadecimal 1C to the common address associated with DOR 232 and second DOR 316. This instruction notifies instruction monitoring circuit 202 that processor 150 is attempting to access internal floppy disk drive 500, and therefore that floppy disk drive control must be transferred to internal floppy disk drive controller 209.

Instruction monitoring circuit 202 transfers floppy disk drive control to internal floppy disk drive controller 209 by issuing the device select signal on the DEVSEL line of PCI Bus 400, thereby keeping peripheral device 300 from responding to the DOR write instruction from processor 150, and allowing internal floppy disk drive controller to receive the DOR write instruction. This change of floppy disk drive control is illustrated in FIG. 4 as arrow 510 from state C to state B. Instruction monitoring circuit 202 allows internal floppy disk drive controller 209 to retain floppy disk drive control until processor 150 issues a DOR write instruction indicating a new transaction with a peripheral floppy disk drive, such as peripheral floppy disk drive 306.

When processor 150 attempts to access a floppy disk drive, it must conventionally issue DMA status read instructions to DMA controller 208. However, because processor 150 may be accessing peripheral floppy disk drive 306, the relevant DMA status registers may be the status registers (not shown) in peripheral DMA controller 330, the DMA controller associated with peripheral floppy disk drive controller 306. DMA status registers 228 must therefore be updated to include the correct status of peripheral DMA controller 330.

When processor 150 seeks the status of peripheral floppy disk drive 306 from DMA 208, instruction monitoring circuit 202 updates DMA status registers 228 with the contents of status registers in peripheral DMA controller 330 by issuing a PCI retry instruction to processor 150, which instructs processor 150 to retry the same DMA status request instruction a few PCI clock cycles later. Instruction monitoring circuit 202 then outputs a read instruction on PCI bus 400 to peripheral DMA controller 330 in PCI-ISA bridge circuit 302 and merges the status of peripheral DMA controller 330 with the status of DMA controller 208 in DMA status registers 228. When processor 150 subsequently retries the DMA status request instruction to DMA status registers 228, DMA controller 208 returns the correct status of peripheral DMA controller 330.

As shown in FIG. 4, processor 150 can selectively access either of the like-addressed floppy disk-drive controllers (internal floppy disk drive controller 209 or peripheral floppy disk drive controller 312). Thus, this satisfies the need for a peripheral interface that allows a processor to selectively access more than one like-addressed device on the same bus.

The above description is illustrative and not limiting. Other embodiments of this invention will be apparent to one of ordinary skill in the art in light of the above disclosure. For example, an interface in accordance with the present invention may be employed to selectively access more than one like-addressed device on a single bus other than a PCI bus.

APPENDIX A

```
1    module pciisa (pci_request, pci_write, pci_irdy, pci_frame,
2                   pci_grant, any_isa_irq, pci_trdy);
3    output pci_request, pci_write, pci_irdy, pci_frame;
4    input pci_grant, any_isa_irq, pci_trdy, reset, pciclk;
5    reg state;
6    non-active = 'b0
7    active = 'b1
8    always @(posedge pciclk)
9    begin
10       if reset == active
11       begin
12          state = 'b0;
13          pci_request = non-active;
14          pci_write = non-active;
15          pci_irdy = non-active;
16          pci_frame = non-active;
17       end
18       else
19       if (state == 'b0)
20          if any_isa_irq == active
21          begin
22             state = 'b01;
23             pci_request = active;
24          end
25       if state == 2'b01
26       begin
27          if pci_grant == active
28          begin
29             pci_request = non-active;
```

```
30          pci_write = active;
31          pci_frame = active;
32          state = '2'b11;
33      end
34  end
35  if state == 2'b11
36  begin
37      pci_irdy = active;
38      pci_write = non-active;
39      if pci_trdy == active
40      begin
41          state = 2'b00;
42          pci_irdy = non-active;
43          pci_frame = non-active;
44      end
45  end
46 end.
```

APPENDIX B

```
1    module pcisio (pci_trdy, pci_devsel, first_bus_write, first_bus_read, rst_bit,
2                   dsr_read, dor_read, ccr_read, msr_read, dsr_write, dor_write,
3                   ccr_write, msr_write, pci_irdy, data, reset)
4    output pci_trdy, pci_devsel, first_bus_write, first_bus_read,
5    input rst_bit, dsr_read, dor_read, ccr_read, msr_read, dsr_write, dor_write,
6                   ccr_write, msr_write, pci_irdy,data,reset, pciclk;
7    reg state, owner;

8    active=1'b1;
9    non-active=1'b0;
10
11   always @(posedge pciclk)
12   begin
13       if reset= = active
14           begin
15                   state=1'b0; // rst_bit to the initial state
16                   owner=1b'1; // Initialize to own the ownership
17                   pci_trdy = non-active;
18                   first_bus_write = non-active;
19                   first_bus_read = non-active;
20           end
21       else
22       begin
23           if state=1'b0
24           begin
25               if (msr_read = = active or
26                   dsr_read = = active or
27                   ccr_read = = active or
28                   dor_read = = active)
```

```
29              begin
30                  if owner == active
31                      pci_devsel = active;
32      // PCI-SIO has the ownership
33                      if pci_irdy == active
34                      begin
35                          if owner == active
36                              pci_trdy = active;
37                          first_bus_read = active;
38                          state = 1'b1;
39                      end
40                  end
41              if (msr_write == active or
42                  ccr_write == active or
43                  dsr_write == active)
44              begin
45                  first_bus_write = active;
46                  if (owner == active) pci_trdy = active;
47              end
48              if (dor_write == active)
49              begin
50                  if (owner == active)
51                      pci_trdy = active;
52                  if (data[1,0] == active_pci_sio)
53      // pci-sio start to gain ownership here
54                  begin
55                      owner = active;
56                      first_bus_write = active;
57                  end;
58                  else
59      // pci-sio lost the ownership
```

```
60              owner = non-active;
61              if (rst_bit == active)
62                  first_bus_write = active;
63  // allow the write operation to flow through to floppy drive controller
64              end
65          end
66      if state == 1'b1
67          begin
68              first_bus_write = non-active;
69              first_bus_read = non-active;
70              pci_trdy = non-active;
71              pci_devsel = non-active;
72              state = 1'b0;
73          end.
```

I claim:

1. A circuit for generating an interrupt signal to a processor from a peripheral device, said circuit comprising:

a bus interface connectable to a bus, wherein said bus may be coupled to said processor and said peripheral device;

an interrupt output terminal connectable to an interrupt input terminal of said processor;

a software-interrupt register coupled to said bus interface; and an interrupt controller coupled to said software-interrupt register and said interrupt output terminal, said interrupt controller configured to output said interrupt signal on said interrupt output terminal in response to said software-interrupt register receiving a software-interrupt instruction from said peripheral device over said bus.

2. The circuit of claim 1, wherein said bus is a PCI bus.

3. The circuit of claim 2, wherein said circuit is initialized by said processor to recognize said software-interrupt instruction and said peripheral device is initialized by said processor to issue said software-interrupt instruction in response to a peripheral interrupt request signal.

4. The circuit of claim 3, wherein said peripheral device comprises a PCI-ISA bridge circuit having an ISA interface and a PCI interface.

5. The circuit of claim 1, wherein said circuit is an integrated circuit.

6. A method of interrupting a processor in response to an interrupt request from a disk-drive controller, said method comprising:

configuring a peripheral device to issue a software-interrupt instruction in response to said interrupt request received from said controller over an ISA bus interrupt request line;

transmitting said interrupt request from said controller to said peripheral device over said ISA bus interrupt request line;

translating said ISA interrupt request to a PCI-bus-compatible software-interrupt instruction;

transmitting said software-interrupt instruction over a PCI bus to a software-interrupt register;

translating said software-interrupt instruction in said software-interrupt register into an interrupt signal; and transmitting said interrupt signal to said processor over an interrupt line.

* * * * *